Aug. 18, 1925.
H. M. HOBART
1,550,166
ELECTRIC GENERATING APPARATUS
Filed March 17, 1922
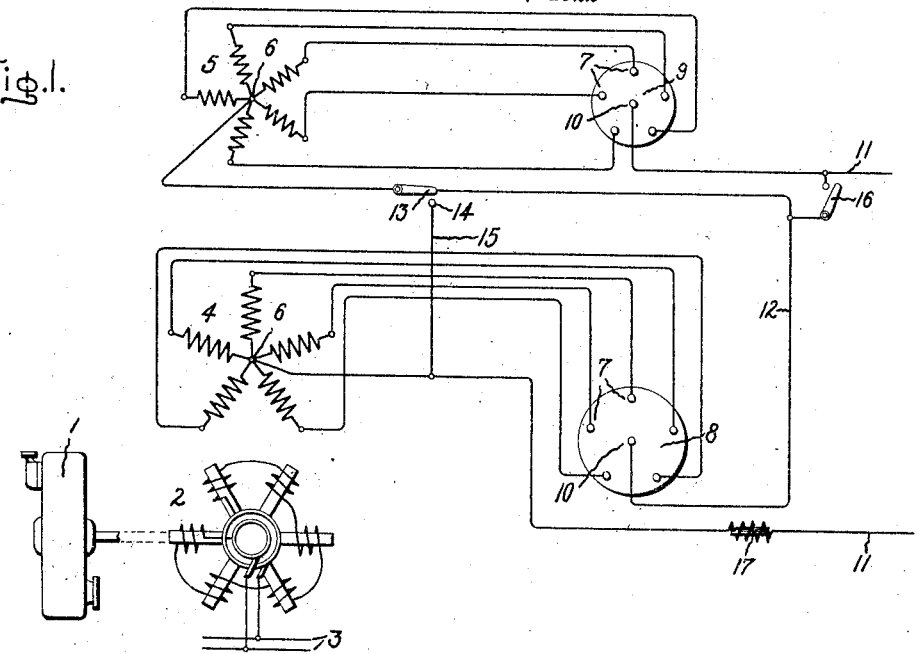
Fig.1.
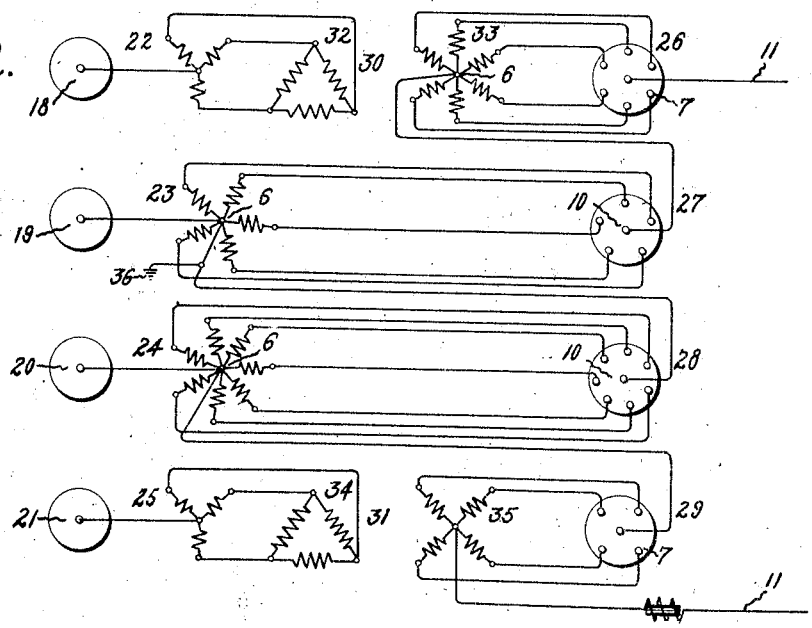
Fig.2.
Fig.3.
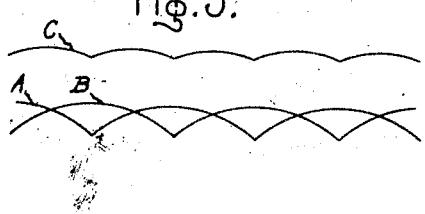
Inventor:
Henry M. Hobart,
by
His Attorney Patented Aug. 18, 1925.

1,550,166

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

ELECTRIC GENERATING APPARATUS.

Application filed March 17, 1922. Serial No. 544,552.

*To all whom it may concern:*

Be it known that I, HENRY M. HOBART, a citizen of the United States, residing at Schenectady, in the county of Schenectady, State of New York, have invented certain new and useful Improvements in Electric Generating Apparatus, of which the following is a specification.

My invention relates to machinery for producing direct current electricity. More specifically, my invention relates to providing machinery whereby the mechanical energy delivered from a high speed steam turbine or other high speed motor may be transformed into direct current electricity with less loss of energy incurred in the transformation and with less outlay for upkeep and attendance than it is possible to obtain when this transformation is effected by other means at present available. These objects are attained in a higher degree the higher the voltage of the direct current electricity. My invention is thus particularly advantageous when used as the generating apparatus for the so-called Thury transmission system. In carrying my invention into effect, I make use of one or more vapor rectifiers supplied from a high speed alternator or alternators preferably designed for frequencies considerably higher than those employed in commercial power circuits. Another object of my invention is to provide a novel arrangement of vapor rectifiers when connected in series or parallel whereby the frequency of the pulsations in the direct current voltage are increased and their amplitude reduced to a minimum. Other advantages of my invention will appear as the description proceeds.

Heretofore, three fundamental types of apparatus have been used for transforming mechanical energy, delivered from steam turbines, into direct current electricity. The first and earliest type comprises an ordinary direct current generator connected to the shaft of the steam turbine. The mechanical and electrical limitations to the design of the commutator were, however, so restricted that it was necessary to design the steam turbine for only a fraction of the speed corresponding to the low steam consumption per horse power hour of output from the steam turbine shaft which is obtainable with designs for higher speeds. Such outfits were never successfully developed for speeds sufficiently high to obtain the best results from steam turbines or for other than relatively very small direct current outputs.

The second type of direct current apparatus known to the prior art comprises a fairly high speed steam turbine delivering mechanical energy through speed reducing gearing to medium speed direct current generators. By this means it is practicable to employ much higher speeds for the steam turbine than in the first type of apparatus above referred to. A speed of 5,000 revolutions per minute is often employed for the turbine, which is still below the most economical speed as regards steam consumption. Speeds of the order of 1,000 revolutions per minute for the direct current generator have been used, which are still higher than desirable for the satisfactory commutation of heavy currents of any considerable voltage. The speed reducing gearing is expensive to install and maintain; it is noisy, and is the seat of friction losses ranging from 2% and more at rated load up to 8% and more at quarter load.

The third type of direct current generating apparatus known to the prior art was devised by the present applicant in 1902 and has been used in a few installations. It is described on page 403 of Hobart and Ellis High Speed Dynamo Electric Machinery, and consists in a polyphase generator direct connected to a high speed steam turbine, and a synchronous converter supplied with polyphase electricity from the stator winding of the polyphase generator. Here again, however, one or the other of the sets must be inefficiently designed and operated because the steam turbine is essentially a high speed machine and the synchronous converter a comparatively low speed, low frequency machine.

The voltage obtainable from a direct current commutator is limited, especially where it is called upon to deliver heavy currents. It has not been found practicable to go above about 2500 volts per commutator for currents above 1000 amperes. Thus, for a 1000 ampere 200,000 volt Thury system we would require 80 direct current commutators connected in series. Although the transmission economies claimed for and doubtless attainable by the Thury system are very attractive, nevertheless this system is not favored because heretofore the proposed generating equipment was too expensive and uneconomical. For this reason it has never been adopted on a sufficiently large scale to take advantage of its great economies. My invention provides a much more economical system of generating high voltage direct current suitable for the long distance transmission of power by using high frequency alternators supplying vapor rectifiers connected in series.

The features of my invention which I believe to be novel and patentable will be pointed out in the claims appended hereto. The construction and mode of operation of my invention will be understood from the following description taken in connection with the accompanying drawing, in which Fig. 1 represents a high speed turbo alternator having a plurality of separate alternating current windings, each connected with a vapor rectifier and supplying a direct current system; Fig. 2 is a diagrammatic modification of my invention suitable for supplying a high voltage direct current transmission system; and Fig. 3, shows curves illustrative of the voltage supplied by a pair of rectifiers when connected in accordance with one feature of my invention.

Referring now to Fig. 1, 1 represents a steam turbine designed for as high a speed as is consistent with reliability and low steam consumption per horse power hour of output. 2 represents a rotating field of an alternating current generator directly connected to the shaft of the steam turbine. The rotor 2 is excited by direct current through suitable brushes and collector rings from a source 3. The stator of the alternating current generator is provided in the present example with a pair of polyphase windings 4 and 5. These polyphase windings are connected in star, or are otherwise connected so as to provide a neutral point for each winding. I have represented the two windings 4 and 5 as having the same number of phases. This however is not essential as will appear later. When the phases of the two or more sets of windings are equal in number, they will preferably be displaced with respect to each other as diagrammatically illustrated. Thus, the upper phase of winding 4, is shown in the vertical position, while the upper phase of winding 5 stands at an angle to the vertical line. Where two sets of 5 phase windings are employed they will preferably be displaced 36° with respect to each other so as to make 10 equally spaced phases on the machine.

Each phase of winding 4 is symmetrically connected to corresponding anodes 7 of a vapor rectifier 8. The phases of winding 5 are similarly connected to the anodes of a similar vapor rectifier 9. The rectifiers are preferably located close to the generator so as to make the connections from the generator to the rectifier as short as practicable. Rectifiers 8 and 9 each have a cathode 10 located equally distant from the anodes and serving as a cathode for all of them. The polyphase type of vapor rectifier such as is here diagrammatically illustrated is well known and need not be further described.

It will now be evident that when the generator is in operation, a direct current may be drawn off from the cathode 10 and the neutral point 6 of either or both systems, one system constituting generator winding 4 and rectifier 8, and the other system constituting generator winding 5 and rectifier 9. Thus winding 4 will generate a synchronously rotating polyphase electromotive force at the anodes 7 of rectifier 8, and an arc discharge will flow between the cathode and the anode or anodes which are positive with respect to this cathode when consuming devices are connected between the neutral point 6 and the cathode 10. The electron stream established between the cathode and the anodes may be likened to a brush rotating synchronously with one end attached to the cathode. A similar operation will take place in rectifier 9 receiving polyphase energy from winding 5. The two systems may be used separately, or, if the two systems are designed for equal voltage and current carrying capacity, they may be connected in series or parallel to supply a direct current circuit. The two systems are illustrated as connected in series to supply a direct current circuit 11. Thus, cathode 10 of rectifier 8 is connected through line 12 and switch 13 to the neutral point 6 of alternating current winding 5, while neutral point 6 of winding 4 and the cathode 10 of rectifier 9 constitute the terminals of direct current circuit 11. I also show a switching arrangement whereby the two systems may be connected in multiple to supply circuit 11. For this purpose switch 13 is thrown down to make connection with contact 14, which will connect the two neutral points 6 through line 15 to one side of circuit 11 and switch 16 will be closed connecting the two cathodes 10 together to the other side of circuit 11.

Referring now to Figure 3, a direct current voltage produced by the two systems may be represented by the exaggerated curves A and B, respectively. The pulsating character of the voltages represented by curves A and B is due to the shifting of one end of the electron stream in the rectifiers from anode to anode. Since the alternating current windings 4 and 5 are displaced with respect to each other, the main portion of the electron stream in one rectifier will be shifting between two consecutive anodes at the instant the main part of the electron stream in the other rectifier is directly on an anode. In this manner the pulsations in the direct current voltage produced by the two systems are made to overlap and if they are connected in series or parallel the resultant direct current voltage will be steadier than would be the case if the two alternator windings were not displaced. Thus in Figure 3 curve C may represent the resultant direct current voltage when the two systems are connected in series. To further eliminate the pulsations of the direct current supplied due to the pulsating character of the voltages I preferably include a small reactor 17 in one of the outgoing lines of the direct current circuit 11. It will be obvious that any number of such systems connected in series or parallel or in series parallel may be supplied from the same generator, and by suitably displacing the separate generator windings the pulsating character of the voltage produced by each system will be substantially ameliorated in the resultant voltage and the reactor 17 may then be much decreased in size. If, instead of having the two five-phase windings 4 and 5 located on the stator of a single generator, the steam turbine 1 is provided with two generators one of them having four poles and, for example, six phases, while the other has six poles and four phases, then the periodicity of the direct current voltage fluctuations will be the same in two rectifiers supplied from these two windings. By locating the two windings in suitable mechanical positions with relation to one another, the pulsations will be as represented by A and B in Fig. 3 and the resultant will be as represented by C in Fig. 3.

I may if desired have windings on the same generator for different voltages permitting the same to simultaneously supply, through rectifiers, direct current circuits of different voltages. It should also be observed that the voltage of the direct current circuit or circuits may readily be controlled by varying the excitation of the alternating current generator. Furthermore my invention is not restricted to the case of steam turbine drive, but its advantages will often make it desirable to employ it for obtaining direct current electricity from a source of polyphase electricity. In such a case a very high speed synchronous motor operated from a polyphase supply is direct connected to the polyphase generator which in turn supplies the mercury arc rectifier or rectifiers. I consider that for many conditions this arrangement is superior to the usual arrangements, which are as follows:

(1) Moderate speed synchronous motor direct connected to a direct current generator.

(2) Static transformers supplying a synchronous converter.

(3) Static transformers supplying a mercury arc rectifier.

The number of poles for which the rotor 2 of the alternating current generator is wound is determined from economic considerations and practicable proportions, but so far as such considerations are found to be substantially equal for two different number of poles the largest number of poles will be used, since it is desirable in my invention, particularly where few rectifiers are connected with overlapping pulsating voltages, to employ the highest economically practicable frequency. The higher the frequency the more completely will any pulsations in the rectifier current be smoothed out by a reactor of reasonable proportions. As of still greater importance it should be noted that the higher the frequency of the currents supplied to the rectifier the less need be the number of anodes for providing direct current with a given degree of freedom from pulsations. The smaller the number of anodes in a mercury arc rectifier the smaller need be the size of the vessel in which the anodes are contained and the more readily can a high vacuum be maintained in this smaller vessel. Or, if it is not necessary to strive to decrease the size of the vessel, it may be said that the smaller the number of anodes the less will be the leakage at the anode seals and the more liberal may be the lateral distance between neighboring anodes and the more simple will be the design of the cooling systems. On the other hand, it is true that anode heating is a limitation to the output of a rectifier and consequently a reasonable multiplicity of anodes distributes the total current amongst a reasonably large number of anodes and increases the facility with which it can be arranged to rapidly convey heat away from these anodes. Six anodes associated with a 50 cycle supply is at present considered not to be quite good enough (with respect to the freedom from pulsations in the direct current circuit) for important services and the tendency is to arrange to employ twelve anodes. In one of the most important installations to which rectifiers are now being employed, these twelve anodes are subdivided in two vessels, there being six anodes in each vessel. By means of the provisions of the present invention equally good results in this respect will be obtained with only six anodes and a 100 cycle supply and much better results with six anodes and a 200 cycle supply.

To give quantitative form to the proposition, let us assume that the steam turbine is designed for 6000 revolutions per minute and the polyphase generator for four poles. This combination would provide a 200 cycle polyphase supply and we might even increase the number of poles on the alternating current generator to 6, giving a supply of 300 cycles per second. Let us assume that a direct current voltage of 1500 volts is desired. It is well known that for this voltage the rectifier will have an efficiency of about 98.5 per cent. At present few, if any, mercury arc rectifiers are in service for delivering continuously currents of over 600 amperes per vessel, although they will carry very much larger currents for short times. The normal rating of such a rectifier in a single vessel would be 1.5×600=900 kw. But let us assume that we employ four such rectifiers in parallel and suitably located adjacent to the alternating current generator. Then the total rated output will be 3600 kw. The efficiency of such a generator, including all the losses in it would be of the order of 96 per cent. Let us allow a further loss of one per cent for reactors and for any other auxiliaries such as vacuum pumps and water circulating pumps, we obtain a total full load efficiency of 93.5 per cent from the shaft of the steam turbine to the direct current circuit. No such high efficiency as this can be obtained with any of the three earlier methods, which I have described above. At half and quarter load the advantage will be still more overwhelmingly in favor of this proposition. Moreover, there is the further gain that the steam turbine has a lower steam consumption per H. P. hour of output than would be practicable by any of the other three schemes. For the particular case employed for purposes of illustration, the normal output of the steam turbine will be about 5000 H. P.

It is a fair analogy to describe my outfit as derived from the ordinary direct current generator by (1) substituting an open circuit winding for the closed circuit winding used on ordinary direct current generators; (2) the open circuit winding is located on the external stator and the direct current excited field on an internal rotor, thus reversing the arrangement employed on an ordinary direct current generator; (3) in place of a commutator on a shaft with all the limitations imposed by limiting peripheral speed and practicable number of segments and practicable speeds at which current can be collected by carbon brushes resting on the surface, and limiting voltages between segments, I substitute the mercury arc rectifier's stationary anodes for the commutator segments and am thus free from all questions associated with centrifugal force and high peripheral speed; (4) for the carbon brushes and brush holders with the associated problems of collection and momentum and the necessity for smooth commutator surface, I substitute a brush consisting of an electron stream, and a brush holder constituting the cathode, and I may thus be said to have substituted a stationary commutator and non-ponderous rotating brushes; (5) in mechanical arrangements with rotating brushes there must be supplied means for driving the brushes at synchronous speed, but the electron stream brush moves from segment to segment at synchronous speed in response to the cyclic shifting of the maximum voltage and the cathode end of the brush does not become twisted up by the rotation of this gaseous brush.

In Fig. 2, I have represented a modification of my invention suitable for supplying the so-called Thury transmission system. In this figure I show prime movers such as water or steam turbines 18, 19, 20 and 21. These prime movers are direct connected to alternating current generators 22, 23, 24 and 25, respectively. These four generators are utilized to supply four vapor rectifier systems represented at 26, 27, 28 and 29, respectively. Although I have shown only a single rectifier supplied from each generator it will be apparent that the latter may supply a plurality of rectifiers as described in connection with Fig. 1. It will be noticed that the middle generators 23 and 24 are connected directly to their rectifiers 27 and 28, while the outer two generators 22 and 25 are connected to their rectifiers 26 and 29 through step-up, phase multiplying transformers 30 and 31 respectively. It will also be noticed that the rectifier 29 has four anodes, rectifier 27 has five anodes, rectifier 26 has six anodes and rectifier 28 has seven anodes, the alternating current windings from which these rectifiers are supplied being provided with the corresponding number of star connected phases. Generator 22 is a 3 phase star connected machine supplying the 3 phase, mesh connected primary 32 of transformer 30, the secondary 33 of which is a star connected 6 phase winding supplying the six anodes of rectifier 26; generator 23 has a 5 phase, star connected winding supplying the five anodes of rectifier 27; generator 24 has a 7 phase, star connected winding supplying the seven anodes of rectifier 28 and generator 25 is a 3 phase, star connected generator supplying the 3 phase, mesh connected primary 34 of transformer 31, the secondary 35 of which is star connected with four phases supplying the four anodes of rectifier 29. The four systems are connected in series as illustrated. The cathode of rectifier 26 and the neutral point of the transformer winding 35 constitute the terminals of the high voltage, direct current transmission line 11. The cathode of rectifiers 27, 28 and 29 are connected to the neutral points of windings 33, 23 and 24 respectively. By making the various rectifiers with different number of anodes and providing the alternating current winding to which they are connected with corresponding different number of phases, I provide another method of increasing the periodicity of the voltage pulsations of the rectifiers. Thus, assuming the frequencies produced by the four generators are equal and that the generators are in synchronism with one another, it will be apparent that the synchronously rotating gaseous brushes in each rectifier will rotate in synchronism. However, since the number of anodes in the various rectifiers are unequal, the voltage pulsations of the various rectifiers will overlap and the resultant pulsations will be of higher periodicity in the series circuit and their amplitude may be maintained low by a relatively small reactor. It will be obvious that it will not be necessary or even desirable to maintain exact synchronism between the various generators to accomplish this result. Instead of making the series rectifier systems of a different number of phases, I may accomplish the same result by maintaining the phases equal and making the frequencies unequal. Thus I might provide each system with six phases and maintain frequencies of 180, 190, 200 and 210 cycles per second on the four generators. The rotating electron stream discharges in the various rectifiers would then be out of synchronism with each other and the voltage pulsations would overlap thus establishing higher frequency pulsations in the resulting voltage. This feature of obtaining increased frequency of pulsations in the direct current circuit without the need for synchronous operation of the prime movers or motors driving generators, works in very nicely in the case of a high voltage transmission system spread over a large area since it permits of looping into the series system rectifiers supplied from local sources of power in various parts of the scattered area. As a practical illustration of the system outlined in Fig. 2, let us assume the problem of generating 100,000 kw. at 200,000 volts and 500 amperes for direct current transmission. Let 18, 19, 20 and 21 represent four water power driven turbines direct connected to four alternating current generators 22, 23, 24, and 25 such that the latter each have a rating of 25,000 kw. Generators 23 and 24 will be located on either side of the grounded point 36 and consequently will have a maximum difference of potential from earth of 50,000 volts in terms of direct current voltage, which it should be noted is no more severe than 35,000 volts alternating current. This potential difference is feasible if the stator windings are immersed in oil to prevent corona effects. The outer generators 22 and 25 are connected to their rectifiers through transformers 30 and 31. Since the maximum voltage to ground on these rectifiers is 100,000 it is no longer desirable to go straight from the terminals of the generator windings to the anodes of the rectifiers. Although I have represented only one transformer, two or more may be used as desired with each outer generator. It will not be necessary to immerse the stator windings of the outer generators in oil since they will be for only moderate voltages. Coming now to the rectifiers, outfits for large currents at 1500 volts are already articles of commerce and I will base this illustrative example on only 2000 volts per rectifier, although I consider that it is feasible, by using rectifiers known as the steel mercury arc type, to obtain 5000 volts at 500 amperes from each rectifier. On the basis of 2000 volts per rectifier each generator would supply twenty-five such rectifiers all connected in series. These rectifiers would be mounted on insulated platforms and the total of 100 rectifiers for the four generators would be connected in series to supply a 200,000 volt direct current Thury transmission system. With this many rectifiers connected in series and arranged to have the voltage pulsations overlapped by the use of one or more of the methods previously described, the high frequency pulsations will be smoothed out by a relatively small reactor such as shown at 17.

The speed, number of poles and frequencies of the generators will be governed more or less by economy and design and the nature of the hydraulic conditions. However, for reasons heretofore stated, I prefer to use a fairly high frequency, especially for those generators supplying the rectifiers through the intermediary of transformers or compensators. The transformers 30 and 31 may be made smaller, cheaper and more efficiently when high frequencies are used. The generators 19 and 20, not having transformers, may if desirable, have somewhat lower frequencies, especially if wound for more phases. Voltage control will preferably be maintained by generator field adjustment either automatically or manually.

As to the efficiency of this generating system, the generators would have the usual efficiency of generators of this rating, presumably, some 96%. For the inner generators there are no transformers and the efficiency of the rectifiers would be 98.5%, thus the combined efficiency of the inner generators and their rectifiers would be 94.5%. The outer generator systems must be debited with the losses in the transformers, but since these are for high frequencies, say 200 cycles per second, they would, for their rating, having an efficiency of 99% so that the combined efficiency of the outer generators, transformers, and rectifiers would be 93.5%. Let us allow a further one-half per cent for losses in various auxiliary machinery. The total efficiency of the generating plant including all generators, transformers and rectifiers would, therefore, be $$\frac{94.5+93.5}{2} - 0.5 = 93.5$$

per cent. This is certainly considerably higher than would be possible with any generating proposition for the Thury system involving direct current generators. Furthermore, the capital outlay for such a system would be much below the capital outlay for a Thury generating system of the type heretofore contemplated and employed.

In certain of the appended claims, the expressions "high speed corresponding to maximum economy" and "a frequency as high as is practicable consistent with economy and reliability" have been used. I have hereinbefore given examples of certain desirable combinations of values for the speed and frequency. It will be evident that the speed to be used in any particular case will depend upon the type of prime mover or motor to be used and also its capacity. For instance, the most desirable speed from the standpoint of a medium sized steam turbine might be 7,000 R. P. M., whereas, it would probably be more desirable to operate a large capacity water turbine at a somewhat lower speed. The most economical speed of the water turbine will also depend on the water pressure available, etc. The frequency to be selected should be as high as is practicable, consistent with economy and reliability. If the direct connected generator is to be driven at 7,000 R. P. M., it may safely and economically be designed with 4 poles giving a frequency of about 233 cycles per second. If a somewhat lower speed is used, it will be desirable to use a greater number of poles on the generator, being careful to keep the peripheral speed of the rotor within the limits of safe mechanical design. With this explanation, it will be clear what I mean by the expressions above referred to. At the same time, it will be evident that I do not wish to limit the invention to any particular set of values since these values depend upon a number of variable considerations and upon each other.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:—

1. An electric generating system for producing high voltage direct currents comprising a plurality of generating outfits, each generating outfit comprising a motor driven alternating current generator and a plurality of rectifying systems supplied thereby, each rectifying system comprising a polyphase vapor rectifier supplied from a winding on its respective generator, means whereby various rectifier systems of all the outfits may be connected in series to obtain the desired high direct current voltage, a grounded connection for the series connection and transformers in the supply connections of certain of the rectifier systems whereby the potential to ground on each generator is kept within safe limits.

2. An electric generating system for producing high voltage direct currents comprising a plurality of generating outfits, each generating outfit comprising a motor driven alternating current generator and a plurality of rectifying systems supplied thereby, said rectifying systems supplied from different generators being of different phases and each comprising a polyphase vapor rectifier supplied from a winding on its respective generator, means whereby various rectifier systems of all the devices may be connected in series to obtain the desired high direct current voltage, a grounded connection for the series connection and transformers in the supply systems of certain of the rectifying systems whereby the potential to ground on each generator is kept within safe limits.

3. An electric generating system for producing high voltage direct currents comprising a plurality of generating outfits, each generating outfit comprising a motor driven alternating current generator and a plurality of rectifying systems supplied thereby, said generators being of different frequencies, each rectifying system comprising a polyphase vapor rectifier supplied from a winding on its respective generator, means whereby various rectifier systems of all the devices may be connected in series to obtain the desired high direct current voltage, a grounded connection for the series connection and transformers in the supply systems of certain of the rectifying systems whereby the potential to ground on each generator is kept within safe limits.

4. An electric generating system for producing high voltage direct currents comprising a plurality of generating outfits, each generating outfit comprising a motor driven alternating current generator, said generators being of different frequencies and a plurality of rectifying systems supplied thereby, the rectifying systems supplied from different generators being of different phase numbers, each rectifying system comprising a polyphase vapor rectifier, supplied from a winding on its respective generator, means whereby various rectifier systems of all the devices may be connected in series to obtain the desired high direct current voltage, a grounded connection for the series connection and transformers in the supply systems of certain of the rectifying systems whereby the potential to ground on each generator is kept within safe limits.

In witness whereof, I have hereunto set my hand this 16th day of March, 1922.

HENRY M. HOBART.